(12) United States Patent
Osburn

(10) Patent No.: US 9,489,862 B2
(45) Date of Patent: Nov. 8, 2016

(54) MUSIC THEORY CASINO FUNDAMENTALS GAME

(71) Applicant: Rodney Troy Osburn, Conifer, CO (US)

(72) Inventor: Rodney Troy Osburn, Conifer, CO (US)

(73) Assignee: Rodney Troy Osburn, Conifer, CO (US)

( * ) Notice: Subject to any disclaimer, the term of this patent is extended or adjusted under 35 U.S.C. 154(b) by 0 days.

(21) Appl. No.: 14/670,767

(22) Filed: Mar. 27, 2015

(65) Prior Publication Data

US 2015/0379886 A1   Dec. 31, 2015

Related U.S. Application Data

(60) Provisional application No. 61/972,104, filed on Mar. 28, 2014.

(51) Int. Cl.
| | |
|---|---|
| *G09B 15/02* | (2006.01) |
| *G09B 15/00* | (2006.01) |
| *G10G 1/02* | (2006.01) |
| *A63F 3/00* | (2006.01) |
| *A63F 13/00* | (2014.01) |

(52) U.S. Cl.
CPC ............. *G09B 15/023* (2013.01); *A63F 3/00* (2013.01); *A63F 3/00119* (2013.01); *A63F 13/005* (2013.01); *G09B 15/00* (2013.01); *G09B 15/005* (2013.01); *G09B 15/006* (2013.01); *G09B 15/02* (2013.01); *G09B 15/026* (2013.01); *G10G 1/02* (2013.01)

(58) Field of Classification Search
CPC .. G09B 15/023; G09B 15/02; G09B 15/026; A63F 3/00; A63F 3/00119; A63F 13/005

USPC .......................................................... 84/473
See application file for complete search history.

(56) References Cited

U.S. PATENT DOCUMENTS

| | | | | |
|---|---|---|---|---|
| 1,768,706 | A * | 7/1930 | Miller | G09B 15/02 |
| | | | | 84/471 R |
| 3,070,371 | A * | 12/1962 | Hearle | A63F 3/00119 |
| | | | | 273/141 R |
| 3,256,765 | A * | 6/1966 | Siegel | G09B 15/00 |
| | | | | 84/470 R |
| 3,570,360 | A * | 3/1971 | Siegel | G09B 15/006 |
| | | | | 84/477 R |
| 3,677,130 | A * | 7/1972 | Petreycik | G09B 15/005 |
| | | | | 84/471 R |
| 3,678,796 | A * | 7/1972 | Puopolo | G09B 15/005 |
| | | | | 84/471 R |
| 3,728,930 | A * | 4/1973 | Maron | G09B 15/005 |
| | | | | 84/471 R |
| 3,728,931 | A * | 4/1973 | Leonard | G09B 15/006 |
| | | | | 84/471 R |
| 3,771,409 | A * | 11/1973 | Rickey | G09B 15/006 |
| | | | | 84/471 R |

(Continued)

*Primary Examiner* — David Warren
*Assistant Examiner* — Christina Schreiber

(57) ABSTRACT

The invention is a game that contains several tactile pieces that can be manipulated to explain the fundamentals of music theory. The musical game hardware/teaching aids collectively called "Music Theory Casino Fundamentals Game" includes a scale isolator board, circle of 5ths spin wheel, 60 key cards, 1 wild card, 9 (or more) step tiles, major and 3 forms of minor formula flat board insert, accidental game pieces, 8-sided die containing the numbers 0-7, sharp/flat coin and harmonic/melodic coin. The teaching aids resemble game hardware found in gambling casinos and provide the user with a "game like" feel while they learn the fundamentals of music theory.

17 Claims, 22 Drawing Sheets

(56) References Cited

U.S. PATENT DOCUMENTS

| | | | | | |
|---|---|---|---|---|---|
| 3,960,046 | A * | 6/1976 | Choong | | G10G 1/02 235/78 R |
| 3,994,500 | A * | 11/1976 | Schow | | A63F 3/00119 273/243 |
| 4,602,550 | A * | 7/1986 | Dadi | | G09B 15/006 84/473 |
| 4,895,374 | A * | 1/1990 | Bowles | | A63F 3/00119 273/249 |
| 4,960,029 | A * | 10/1990 | Nelson | | G09B 15/026 235/70 R |
| 4,969,383 | A * | 11/1990 | Bezeau, Jr. | | G10G 1/02 84/473 |
| 5,524,522 | A * | 6/1996 | Hesnan | | G09B 15/003 84/471 SR |
| 5,639,977 | A * | 6/1997 | Hesnan | | G09B 15/003 84/477 R |
| 5,644,096 | A * | 7/1997 | Bull | | G10G 1/02 84/471 SR |
| 6,086,378 | A * | 7/2000 | Johnson | | G09B 15/026 273/236 |
| 6,841,724 | B2 * | 1/2005 | George | | G09B 15/026 84/474 |
| 7,301,090 | B2 * | 11/2007 | Kerkhoff | | G09B 15/08 84/485 SR |
| 7,306,226 | B2 * | 12/2007 | Gagnon | | A63F 3/00119 273/242 |
| 7,345,231 | B2 * | 3/2008 | Guinness | | G09B 15/006 84/100 |
| 7,396,988 | B1 * | 7/2008 | Rowe | | G09B 15/02 84/476 |
| 8,309,832 | B2 * | 11/2012 | Sattlecker | | G10G 1/02 84/483.1 |
| 8,662,894 | B2 * | 3/2014 | Paratore | | A63F 13/005 434/128 |
| 2003/0167902 | A1 * | 9/2003 | Hiner | | G09B 15/02 84/477 R |
| 2004/0094896 | A1 * | 5/2004 | Simmons | | A63F 3/00119 273/301 |
| 2006/0076733 | A1 * | 4/2006 | Ritchie | | A63F 3/00119 273/242 |
| 2007/0060351 | A1 * | 3/2007 | Paratore | | A63F 13/005 463/35 |
| 2009/0173212 | A1 * | 7/2009 | Wold | | G09B 15/02 84/483.2 |
| 2010/0288105 | A1 * | 11/2010 | Rose | | G09B 21/003 84/483.2 |
| 2011/0232463 | A1 * | 9/2011 | Sattlecker | | G10G 1/02 84/613 |
| 2013/0186260 | A1 * | 7/2013 | Velho | | G09B 15/02 84/645 |

\* cited by examiner

Fig. 1E: TERMS FOR THE TOP-SIDE VIEW OF THE SCALE ISOLATOR

1. scale isolator
2. step tiles
3. major and 3 forms of minor formula flat board insert
4A. long U-channel frame
4B. short U-channel frame
5. key signature disk
6A. long sliding key signature cover
6B. long blank staff paper label
7A. clear disk holder
7B. clear disk holder's 9 o'clock bump
8A. horizontal slider
8B. treble clef staff paper label
8C. clear window
8D. definition sheet
8E. 90 degree lip
9. bookend blocks
10A. bilevel board
10B. enharmonic keyboard label
11A. staff slider
11B. notes on staff picture
12. staff peg adjuster
13. end board spacer

Fig. 2C: TERMS FOR THE BOTTOM-SIDE VIEW OF THE SCALE ISOLATOR

1. scale isolator
2. step tiles
3. major and 3 forms of minor formula flat board insert
4A. long U-channel frame
4B. short U-channel frame
5. key signature disk
6C. short sliding key signature cover
6D. short blank staff paper label
8F. clear vertical slider
8G. disk holder hole
8H. disk holder hole's 9 o'clock bump
8I. 180 degree long sleeve
8J. 180 degree short sleeve
8K. blank staff with ledger lines
9. bookend blocks
10C. reverse side of bilevel board
10D. ascending/descending whole note picture
14. clear vertical slider holder

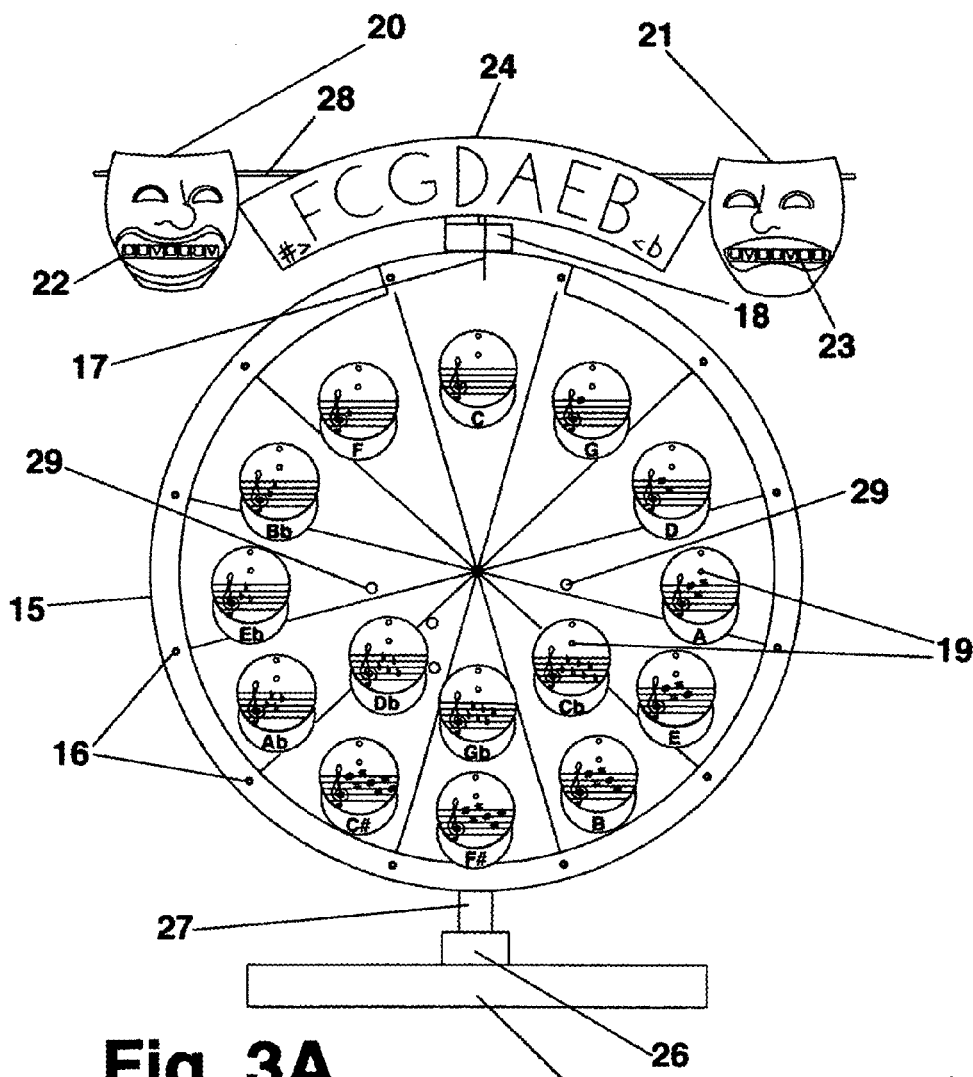
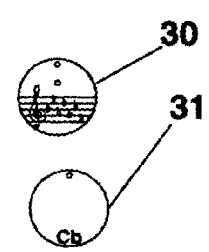
Fig. 3A
Fig. 3B

Fig. 3C: TERMS FOR THE FRONT-SIDE VIEW OF THE CIRCLE OF 5THS SPIN WHEEL AND INFORMATION DISKS

15. spin wheel
16. 12 pegs
17. leather flap
18. leather flap holder
19. information disk pegs
20. comedy drama mask
21. tragedy drama mask
22. major scale step-formula-insert
23. minor scale step-formula-insert
24. order of accidentals mnemonic sign
25. base
26. base extension
27. post
28. drama mask holder rod
29. cam
30. outside information disk
31. inside information disk

Fig. 6

| # | # | # | # |
|---|---|---|---|
| # | # | # | # |
| ♭ | ♭ | ♭ | ♭ |
| ♭ | ♭ | ♭ | ♭ |
| 𝄪 | 𝄪 | ♮ | ♮ |

MUSIC THEORY CASINO FUNDAMENTALS GAME

CROSS-REFERENCE TO RELATED APPLICATIONS

This application claims the benefit of provisional patent application Ser. No. 61/972,104 filed 2014 Mar. 28 by the present inventor.

FEDERALLY SPONSORED RESEARCH

None

SEQUENCE LISTING

None

The following is a tabulation of some prior art that presently appears relevant:

| Pat. No. | Kind Code | Issue Date | Patentee |
|---|---|---|---|
| 5,524,522 | A | 1996 Jun. 11 | Hesnan |
| 4,895,374 | | 1990 Jan. 23 | Bowles |
| 5,639,977 | | 1997 | Ericksen |
| 1,768,706 | | 1930 Jul. 1 | Miller |

BACKGROUND

Music educators teach the topics of scales, modes, circle of 5ths and key signatures as part of formal musical training. The study of these fundamental topics is necessary in understanding how to read notated music. Traditionally, these topics are taught by having students write the notes of various scales on staves, draw intervalic symbols, and write accidentals within a scale and in key signatures. For tonal application, students often sing or play on a keyboard instrument the various scales they are studying in concurrent lab-type courses. Further, key signature memorization is often taught by rote and through frequent quizzing These traditional methods have achieved mixed results.

Students frequently object to the rigor involved in learning scales, modes, circle of 5ths and key signatures as part of their initiation to formal musical training. Deciding to dabble in introductory music fundamentals as part of their freshman-level survey courses in college, students may often change their minds about pursuing music for a future topic of study because of the work load and general lack of fun. Fundamental music topics are often left out of the curriculum in grades 5-8, the precise time formal operational students can comprehend these basic and necessary concepts. Since understanding scales, key signatures and the circle of 5ths is so essential in deciphering musical notation, educators need to have more enjoyable ways to engage their students when broaching these topics.

Although numerous textbooks written on the subject completely address fundamental music concepts, the application exercises in these books are often joyless read-and-write style activities. Computer applications like Finale and Sibelius, while marvelous in their capacity of synthesizing the sound that notation represents, require constant and expensive software upgrades. Also, these applications are tactile in a computer sense, generally accessible via a touch screen or typewriter-style keyboard.

Several types of simple musical teaching aids have been proposed—for example a "Music Teaching Aid" U.S. Pat. No. 5,524,522 (1996) to Hesnan. An embodiment of this device allows for the cross-referencing of certain musical information including note position, scale and chord calculation. These alignments are made possible through use of a series of slide-rule-type templates and slots over a planar base. While many broad claims regarding both instrumental technique and music theory are made in Hesnan's "Music Teaching Aid," the device does not specifically address the melodic minor scale, which must be discussed in both an ascending as well as descending direction. Furthermore, Hesnan's device does not have tactile game pieces which could be used to help students manipulate educational content competitively in a game-like fashion as they learn.

U.S. Pat. No. 1,768,706 to Miller (1930) contains a graphic illustration of horizontal notes on a staff device lined up with a vertical picture of a piano keyboard. Unlike the scale isolator in the present invention, the keyboard in Miller's device cannot be horizontally juxtaposed with a horizontal picture of notes on the staff, which is the way musicians view both a staff and piano when reading and playing music. Also, Miller's device does not allow for keyboard notes containing accidentals to align with corresponding lines and spaces of the staff.

U.S. Pat. No. 5,639,977 to Hesnan (1997) has an embodiment that allows for key signature identification using a vertical slider. This device, however, does not have game-like manipulatives such as cards, major and 3 forms of minor formula flat board insert and accidentals to address musical rudiments in understanding how key signatures are derived.

U.S. Pat. No. 4,895,374 to Bowles (1990) has an embodiment containing a 6-sided die with several musical alphabet letters and colored tokens resembling coins with musical letters ABCDEFG. The 8-sided die in the present invention contains the numbers 01234567 as well as 2 coin-like game pieces; one containing the symbols for a sharp or a flat, and one containing the letter H (for Harmonic) and the letter M (for Melodic). Unlike the Bowles embodiment whose single 6-sided die does not address either every letter name of the musical alphabet, of which there are 7, or the concept of key signatures, the dice and 2 coins in the current invention enable the random possibility for a player to roll any of the 60 key-signature permutations.

SUMMARY

The invention is an improved music fundamentals game that allows a user to manipulate tactile game pieces while learning several fundamentals of music theory. Users of the game will acquire an understanding of enharmonic spellings of notes on a keyboard, staff note identification, intervalic step relationships, scales, modes, circle of 5ths and key signatures.

The advantages of the current invention will become apparent from a study of the following description and the accompanying drawings—figures.

DRAWINGS

Figures

FIG. 1E is a list of terms for the top side view of the scale isolator.

FIG. 2C is a list of terms for the bottom side view of the scale isolator.

FIG. 3A is a front side view of the circle of 5ths spin wheel.

FIG. 3B is a front side view of the outside and inside information disks.

FIG. 3C is a list of terms for the front side view of the circle of 5ths spin wheel.

FIG. 6 is a picture of the accidental game pieces.

DETAILED DESCRIPTION

Figure 1A:
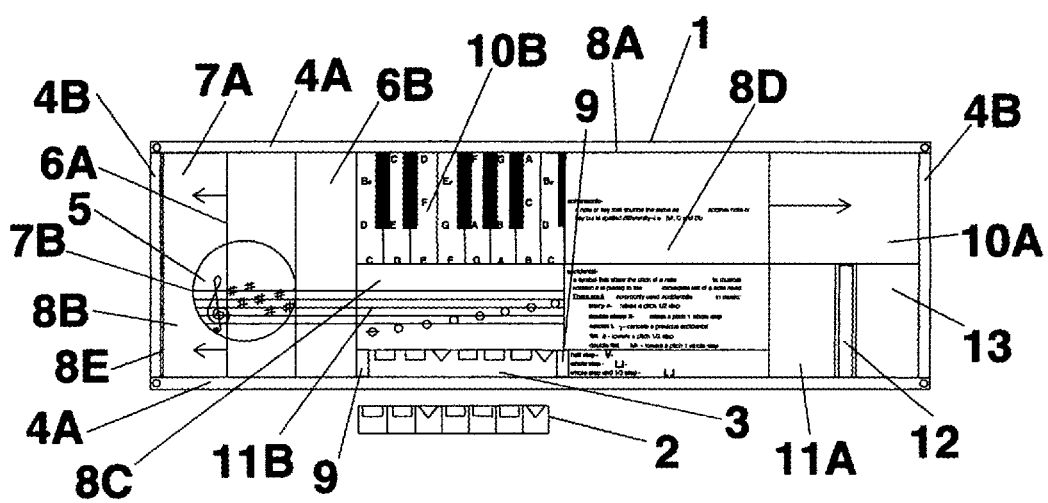
FIG. 1A is an assembled top orthogonal view of the scale isolator.
Figure 1B:
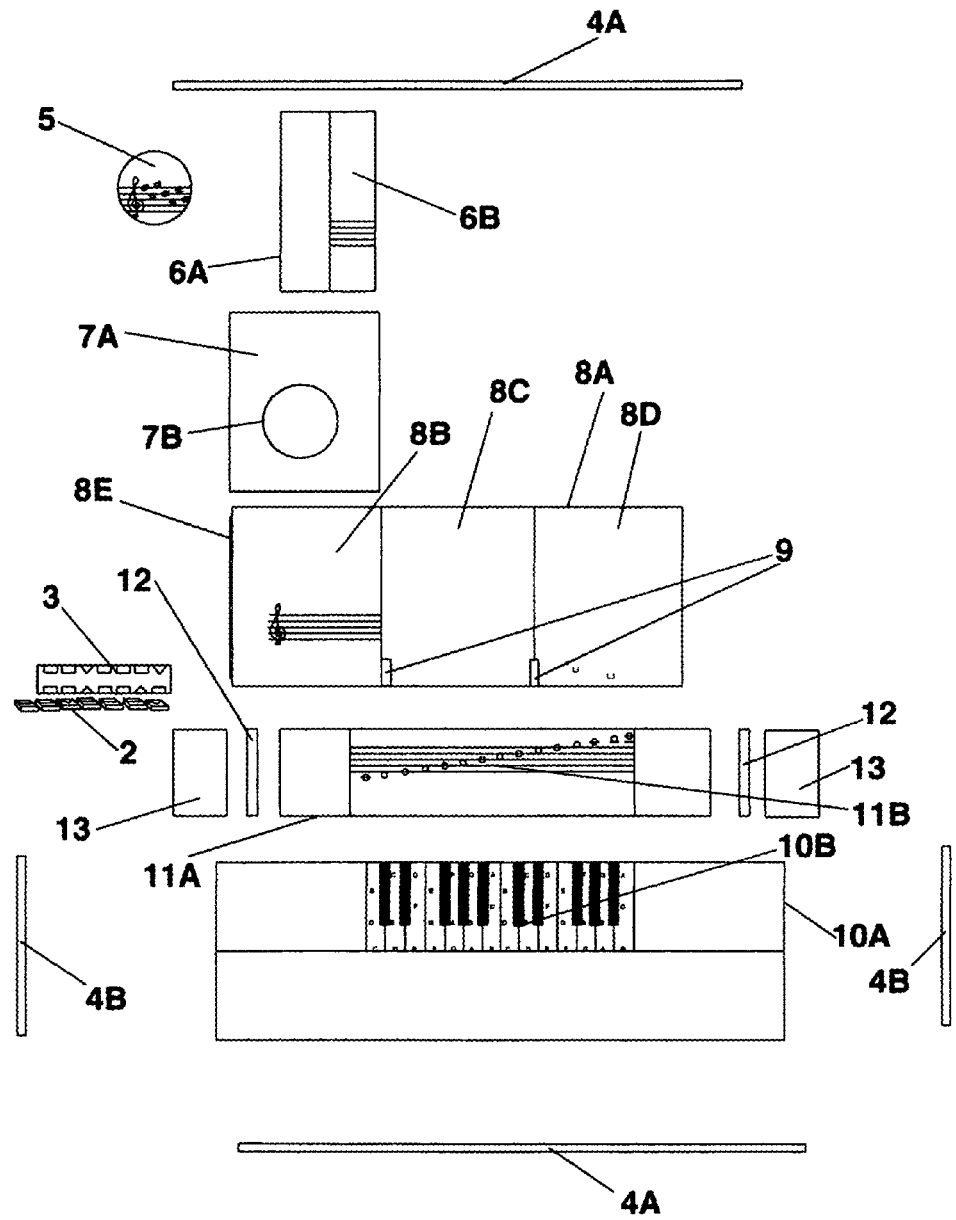
FIG. 1B is an exploded top orthogonal view of the scale isolator.
Figure 1C:
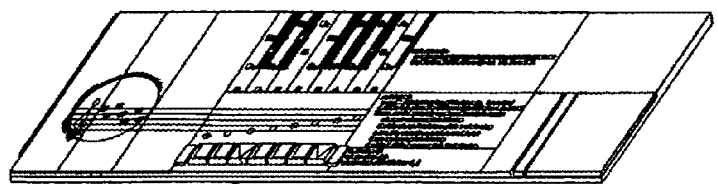
FIG. 1C is an assembled perspective top view of the scale isolator without a frame.
Figure 1D:
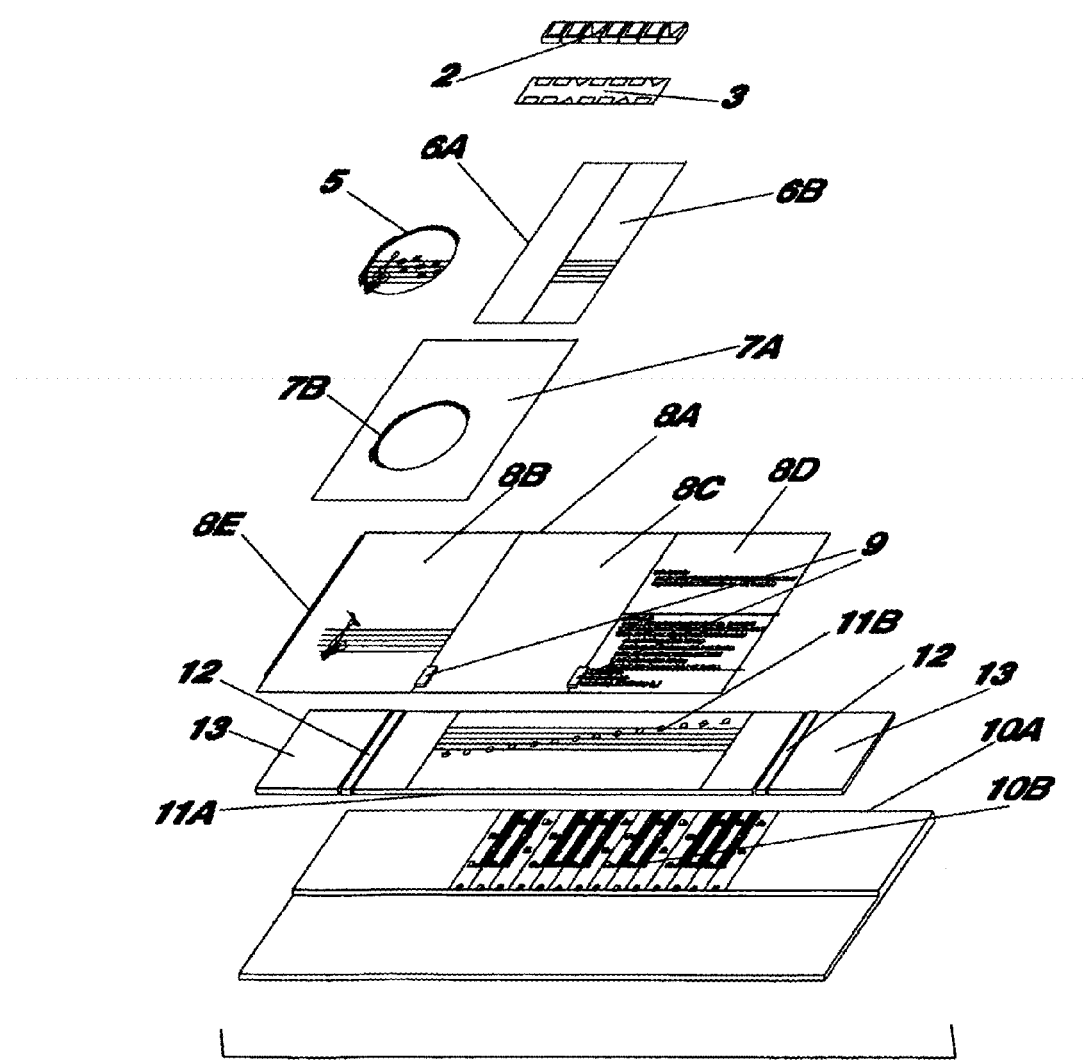
FIG. 1D is an exploded perspective top view of the scale isolator without a frame.

FIGS. 1A, 1B, 1C, 1D and 1E: Top Side of Scale Isolator

1. The scale isolator 1 is a device that enables isolation and construction of major scales, 3 forms of minor scales, modes or any of the 15 key signatures.

2. The device in paragraph 1 contains a horizontal slider 8A.

3. The horizontal slider 8A in paragraph 2 is a rectangular piece of plexiglass-like material containing a clear window 8C formed from blocking out regions on both the left 8B and right 8D sides of the glass with label-adhesive-type material.

4. The horizontal slider 8A in paragraph 2 slides over an area of the staff slider 11A from paragraph 31, which contains a picture of 15 ascending whole notes on a staff.

5. The 15 ascending whole notes from paragraph 4 are the notes on staff picture 11B.

6. The clear window 8C of the horizontal slider 8A in paragraph 3 will expose 8 ascending whole notes arranged in a scale from the notes on staff picture 11B in paragraph 5.

7. By moving the horizontal slider 8A in paragraph 3 left or right, an example of every type of ascending 8-note musical scale can be isolated for analysis.

8. The exposure of the 8 scale notes in paragraph 6, combined with the use of game pieces called accidentals in paragraph 132 and step tiles 2 in paragraph 137, enable an immediate analysis and construction of scales and key signatures.

9. Pictured on the left label adhesive in paragraph 3 is a musical clef 8B and partial staff that ends where the window begins.

10. Pictured on the right-label adhesive in paragraph 3 are several musical terms on a definition sheet 8D.

11. Isolated in the mid-lower region of the clear window 8C of paragraph 3 are 8 of the ascending notes on the notes on staff picture 11B.

12. Isolated in the upper region of the exposed window of paragraph 3 will be a portion of a picture of a keyboard containing enharmonic spellings.

13. The picture in paragraph 12 is the enharmonic keyboard label 10B.

14. The area of the exposed window in paragraph 3 respectively is calibrated to show the starting and ending pitch of a chromatic keyboard picture 10B in paragraph 13 and an ascending 8-note scale on a staff in paragraph 6.

15. The left and right most area of the clear window 8C will expose a note with the same pitch name, the keynote, when adjusted to the desired key for analysis.

16. Laying directly on top and in a different plane of the left adhesive label of the horizontal slider 8A from paragraph 9, there will be a (rectangular) clear plastic insert, the clear disk holder 7A, whose rectangular perimeter is the exact size of the left adhesive label of the treble clef on a staff 8B. The clear disk holder 7A abuts a 90-degree lip 8E at the left side of the horizontal slider 8A.

17. The clear disk holder 7A from paragraph 16 contains a disk-sized hole whose purpose is to hold the key signature disk 5 from paragraph 19 in line with and to the left most position of the notes on staff picture 11B from paragraph 5.

18. The disk-sized hole from paragraph 17 may contain a tiny bump at the position of 9 o'clock 7B.

19. The key signature disk 5 is a thin disk-shaped device containing a picture of a clef/staff with 7 flats on one side, and a clef/staff with 7 sharps on the other.

20. There may be a slight indentation on either side of the disk from paragraph 19 exactly 180 degrees apart at approximately 9 o'clock and 3 o'clock.

21. The purpose of the indentations of paragraph 20 is to completely immobilize the key signature disk 5 from paragraph 19 when it is inserted in the clear disk holder 7A from paragraph 17.

22. The key signature disk 5 from paragraph 19 may be flipped to either the 7 flats or 7 sharps side.

23. The single bump 7B at 9 o'clock that may be contained in the clear disk holder's disk-sized hole from paragraph 18 will immobilize the key signature disk 5 from paragraph 19 because of the indentations at 9 o'clock and 3 o'clock from paragraph 21.

24. The long sliding key signature cover 6A is a rectangular sliding panel that is the exact height, but near ⅔ the width of the clear disk holder 7A.

25. The left half of the long sliding key signature cover 6A from paragraph 24 is clear.

26. The right half of paragraph 24 contains the picture label of a small staff whose lines are proportional to the staff lines of the notes on staff picture 11B from paragraph 5.

27. The picture label in paragraph 26 will be referred to as the long blank staff paper label 6B.

28. The long sliding key signature cover 6A from paragraph 24 will be positioned in another plane directly over the clear disk holder from paragraph 16.

29. In this position, paragraph 24 may slide ⅓ the horizontal distance over the clear disk holder 7A from paragraph 16.

30. The purpose of the long sliding key signature cover 6A from paragraph 24 is to block out some or all of the exposed accidentals on the key signature disk 5 from paragraph 19 which enables any key signature to be formed by flipping the key signature disk 5 and slightly adjusting the long sliding key signature cover 6A from paragraph 24 to the left or right 31. The staff slider 11A is a rectangular sliding board containing the notes on staff picture 11B.

32. The staff slider from paragraph 31 slides horizontally.

33. The staff slider 11A from paragraph 31 is smaller than the width of the bilevel board 10A from paragraph 34.

34. The bilevel board 10A is the single largest piece of the scale isolator 1.

35. There are two regions of the bi-level board 10A from paragraph 34 which look like a very thin staircase step. (see FIG. 1D—perspective view)

36. The upper rectangular region of paragraph 35 is a thicker surface containing the enharmonic keyboard label 10B from paragraph 13.

37. The lower rectangular region of paragraph 35 is a thinner surface that serves as the track for the staff slider 11A from paragraph 31.

38. The lower rectangular region from paragraph 35 will also afford room for 2 staff peg adjusters 12 in paragraphs 40 and 2 end board spacers 13 in paragraph 39.

39. The end board spacers 13 are permanently attached spacer boards located on either side of the lower track of the bi-level board in paragraph 34.

40. The staff peg adjusters 12, which could be magnetic, are removable and re-positionable pegs.

41. The width of the staff peg adjusters 12 in paragraph 40 will be approximately ½ the size of a single white note on the keyboard picture, a single step tile or the distance between the center of one ascending whole note to the center of the next adjacent whole note.

42. When removed, the staff peg adjusters 12 in paragraph 40 create a space enabling the staff slider 11A from paragraph 31 to be slightly repositioned horizontally.

43. Repositioning the staff slider 11A from paragraph 31 allows for vertical alignment of the notated whole notes with sharp and flat keys on the enharmonic keyboard label 10B from paragraph 13.

44. When necessary, the repositioning in paragraph 43 leaves room to place accidental game pieces from paragraph 132 (FIG. 6) in front of the initial key note on the notes on staff picture 11B from paragraph 5.

45. When both staff peg adjusters 12 from paragraph 40 are together in the left or right position, there will be a space afforded to place an accidental game piece (FIG. 6) to the immediate left of the first key note on the notes on staff picture 11B from paragraph 5, which is not there otherwise.

46. To adjust the staff slider 11A from paragraph 31 in the sharp direction, remove the staff peg adjuster 12 from paragraph 40 on the right and add it to the one on the left.

47. To adjust the staff slider 11A from paragraph 31 in the flat direction, remove the staff peg adjuster 12 from paragraph 40 on the left and add it to the one on the right.

48. To adjust the staff slider 11A from paragraph 31 to scale keys of CDEFGAB, scales that begin and end on white keyboard notes and whose keynotes do not require an accidental, adjust the staff slider 11A from paragraph 31 to the center, putting one staff peg adjuster 12 from paragraph 40 on either side.

Figure 2A:
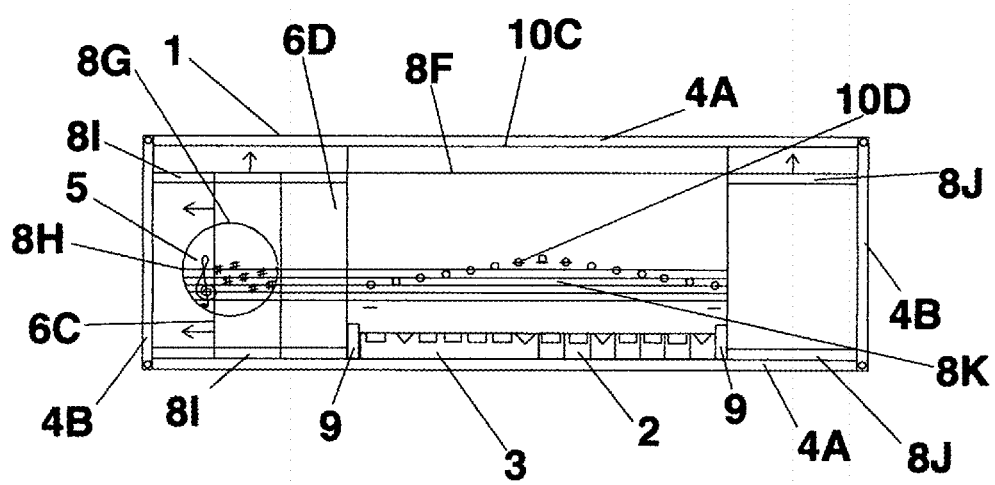
FIG. 2A is an assembled bottom orthogonal view of the scale isolator.
Figure 2B:
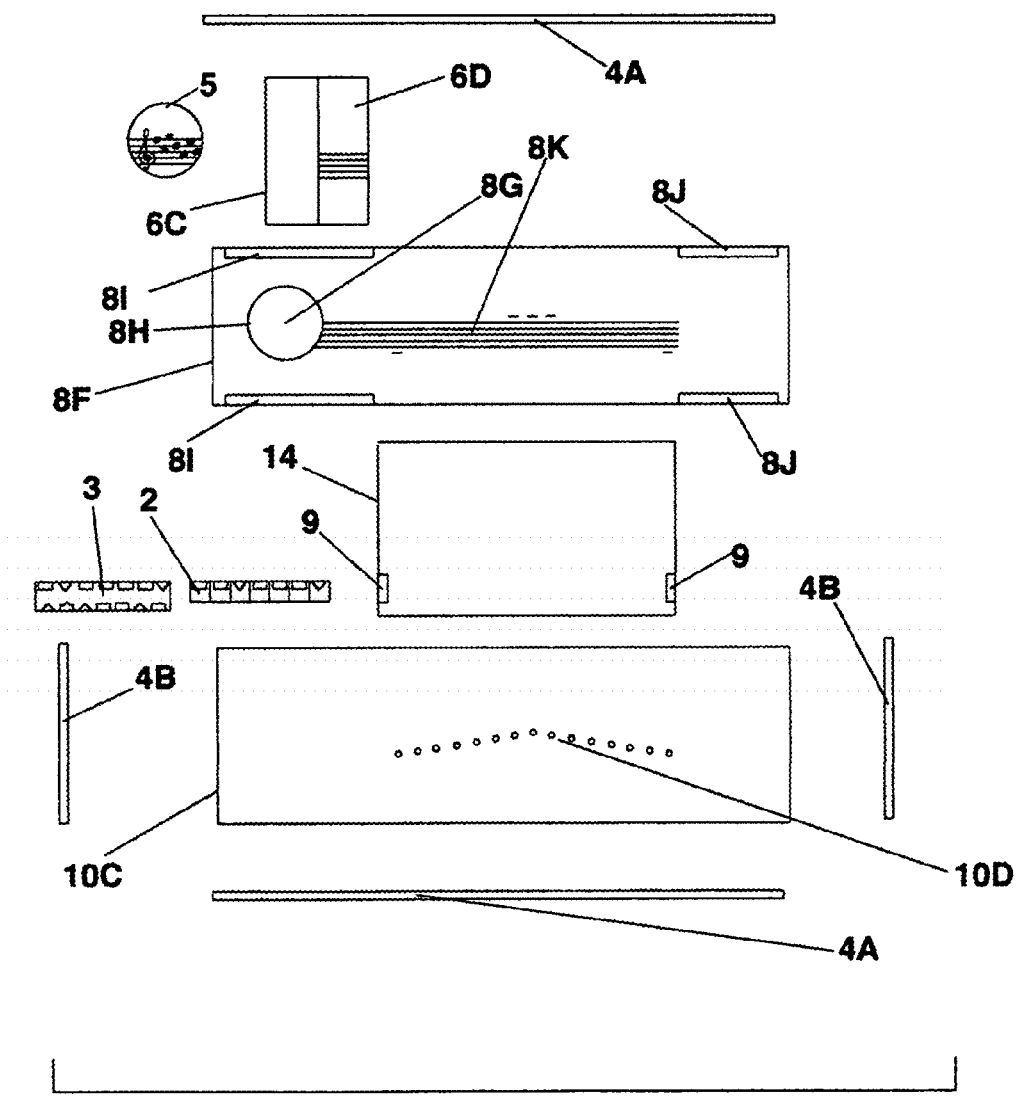
FIG. 2B is an exploded bottom orthogonal view of the scale isolator.

FIGS. 2A, 2B and 2C: Bottom Side of the Scale Isolator

49. On the bottom or reverse side of the scale isolator 1 from paragraph 1, there is a picture of 15 ascending and descending whole notes on a plain white background.

50. The ascending/descending whole note picture 10D from paragraph 49 is an ascending as well as descending picture of an 8 note scale that allows for the melodic minor scale to be analyzed.

51. The reverse side of the scale isolator 1 from paragraph 1 also includes a clear vertical slider 8F containing a superimposed blank staff with ledger lines 8K which will vertically glide over the ascending/descending whole note picture 10D from paragraph 50.

52. The blank staff with ledger lines 8K from paragraph 51 is proportional to the notes on the ascending/descending whole note picture 10D from paragraph 50

53. When the clear vertical slider 8F from paragraph 51 is moved up to its furthest vertical point and stopping at the upper frame perimeter, the superimposed staff will encapsulate an ascending and descending C scale, if the given clef is treble.

54. When the slider in paragraph 51 is moved down to its furthest vertical point, stopping at the lower frame perimeter, the superimposed staff will encapsulate an ascending and descending B scale.

55. The height of the clear vertical slider 8F in paragraph 51 is the size needed to accommodate for all possible ascending and descending diatonic scale scenarios in a one octave range.

56. The clear vertical slider's 8F height will be short the reverse side of the bilevel board's 10C height by the distance between the top and bottom notes on the ascending/descending whole note picture 10D from paragraph 50.

57. There are two 180 degree long sleeves 81 on the upper and lower left regions of the clear vertical slider 8F from paragraph 51.

58. The two 180 degree long sleeves 81 from paragraph 57 are plastic sleeves bent 180 degrees.

59. The purpose of the two 180 degree long sleeves from paragraph 58 is to hold the short sliding key signature cover 6C from paragraph 66 on the left side of the clear vertical slider 8F from paragraph 51.

60. On the upper and lower right regions of the clear vertical slider 8F from paragraph 51, there are two 180 degree short sleeves 8J.

61. The two 180 degree short sleeves from paragraph 60 are plastic sleeves bent 180 degrees.

62. The sleeves 81 and 8J from paragraphs 57 and 60 will need to line up with the top and bottom of the clear vertical slider SF from paragraph 51.

63. Similar to the clear disk holder 7A from paragraph 16, there will be a disk holder hole 8G, whose purpose, once again, is to hold the key signature disk 5 from paragraph 19 in line with and to the left most position of the pictured staff on the clear vertical slider 8F from paragraph 51.

64. The disk holder hole 8G from paragraph 63 may contain a tiny bump at the position of 9 o'clock.

65. The bump in paragraph 64 is the disk holder hole's 9 o'clock bump 8H.

66. The short sliding key signature cover 6C is a rectangular sliding panel that serves the same function as the long sliding key signature cover 6A from paragraph 24.

67. The left half of the short sliding key signature cover 6C from paragraph 66 is clear.

68. The right half of the short sliding key signature cover 6C from paragraph 66 contains the picture label of a small staff 6D that is proportional to the blank staff with ledger lines 8K on the clear vertical slider 8F from paragraph 51.

69. The short sliding key signature cover 6C from paragraph 66 will be positioned in another plane directly over the key signature disk 5 from paragraph 19 when it is positioned in the disk holder hole 8G from paragraph 63.

70. In this position, the short sliding key signature cover 6C from paragraph 66 may slide ⅓ the horizontal distance over the key signature disk 5 from paragraph 19.

71. The purpose of the short sliding key signature cover 6C from paragraph 66 is to block out some or all of the exposed accidentals on the key signature disk 5 from paragraph 19, the implication being that any key signature can be formed by flipping the key signature disk 5 from paragraph 19 and slightly adjusting the short sliding key signature cover 6C from paragraph 66 to the left or right.

FIGS. 3A, 3B and 3C: Circle of 5ths Spin Wheel and Information Disks 72. The spin wheel 15 part of the game apparatus contains 12 pegs 16 inserted perpendicularly at equal intervals around an outermost circumference.

73. A leather flap 17 hangs over the 12 'o clock position of paragraph 72, supported by a leather flap holder 18.

74. The flap 17, slapping against the pegs 16, slows and stops the spin wheel in paragraph 72 as it spins.

75. The mechanical operation in paragraphs 72-74 is essentially a standard spin wheel, similar to a common spin wheel seen at carnivals. To that end, the spin wheel 15 may be mounted to a base 25 via a base extension 26.

76. The wheel in paragraph 72 may be positioned with C Major/A minor at the 12 'o clock region, creating a standard "text book" image of the circle of 5ths.

77. On the interior face of the spin wheel from paragraph 72 are 15 additional perpendicular pegs, the information disc pegs 19.

78. 12 of the information disc pegs 19 from paragraph 77 form an inner circle.

79. This inner circle of pegs from paragraph 77 should allow for: A. the information discs, 30 and 31, to freely hang vertically in a certain clock-numbered region.

B. the information discs, 30 and 31, to remain right-side up with information remaining readable as the spin wheel from paragraph 72 is spun.

C. the information disks, 30 and 31, not to touch the 12 pegs 16 of the outermost circumference as the spin wheel from paragraph 72 is spun.

80. The remaining 3 information disk pegs are located more towards the center of the spin wheel in paragraph 72.

81. The 3 information disk pegs in paragraph 80 form an arc that corresponds with the 3 information pegs from the 12 information disc-peg circle from paragraph 78 located at 5, 6 and 7 'o clock.

82. The placement of the 3 inner pegs from paragraph 80 should allow for the information disks, 30 and 31, to freely hang vertically.

83. The placement of the 3 inner pegs from paragraph 80 should allow for the information disks to remain right-side up with displayed information remaining readable as the spin wheel from paragraph 72 is spun.

84. The placement of the 3 inner pegs from paragraph 80 should allow for the information disks to not touch any of the other information discs as the spin wheel from paragraph 72 is spun.

85. The size of the spin wheel 15 from paragraph 72, positioning of the information disc pegs 19 from paragraphs 78 and 80, and size of the disks, which all vary the proximity of the disks to each other and thereby the mechanics of keeping the information discs vertical while the spin wheel 15 from paragraph 72 is spun, may deem it necessary to include the positioning of cams 29, or small hemispheres of plastic, on the face of the spin wheel 15 from paragraph 72.

86. The cams 29 from paragraph 85 will help to raise and lower the information discs over and under each other as the spin wheel 15 from paragraph 72 is spun, keeping all disks vertical.

87. Cams 29 from paragraph 85 may or may not be necessary to accommodate for varying dimensions used in construction.

88. Each of the interior 15 information disk pegs 19 from paragraph 77 hold two disks, for a total of 30 disks.

89. The sizes of the disks in paragraph 88 can vary depending on the size of the spin wheel 15 in paragraph 72.

90. The information disks 30 & 31 in paragraph 88 display music information.

91. The information disks 30 & 31 in paragraph 88 are stacked on top of each other and hang vertically.

92. The outside information disk 30 refers to the disk whose surface is entirely exposed.

93. The outside information disk 30 in paragraph 90 contains 2 vertical holes on the radius.

94. Neither hole in the outside information disk 30 in paragraph 93 will be directly in the center.

95. The outside information disk 30 can be repositioned vertically up or down using the 2 holes in paragraph 93.

96. The outside information disk 30 in paragraph 92 will completely cover the inside information disk 31 when hung from the outer hole in paragraph 93.

97. The outside information disk 30 in paragraph 92 will partially expose part of the inside information disk 31 in paragraph 98 when hung from the inner hole in paragraph 93.

98. The inside information disk 31 refers to the disk whose surface is covered or partially exposed.

99. Inside information disks 31 in paragraph 98 contains a single hole corresponding to the outer hole of the outside information disk 30 in paragraph 93.

100. When the outside information disk 30 in paragraph 93 is moved to the inner hole, it raises the disk vertically.

101. When the outside information disk 30 in paragraph 93 is hung from the inner hole, the inside information disk's 31 lower crescent region is revealed.

102. The information contained on one side of the outside information disk 30 from paragraph 92 is a key signature.

103. The information contained on the opposite side of the outside information disk 30 from paragraph 92 is a number from 1-7 accompanied by a sharp, flat, or "0".

104. Information contained on the inside information disk 31 in paragraph 98 will be displayed near the lower crescent region.

105. Information contained on one side of the inside information disk 31 in paragraph 104 is some type of capital musical alphabet letter by itself, or a capital musical alphabet letter followed by a sharp or flat symbol.

106. Information contained on the opposite side of the inside information disk 31 in paragraph 98 will be some type of lower-case musical alphabet letter by itself, or a lower-case musical alphabet letter followed by a sharp or flat symbol.

107. The capital letters, some with accidentals, from paragraph 105 are: C, G, D, A, E, B, F sharp, C Sharp, F, Bb, Eb, Ab, Db, Gb and Cb.

108. The lower case letters, some with accidentals, from paragraph 106 are: a, e, b, f sharp, c sharp, g sharp, d sharp, a sharp, d, g, c, f, b flat, e flat, and a flat.

109. Each inside information disc 31 respectively from paragraphs 105 and 106 will contain the major key letter on one side, and its relative minor on the other.

110. The information from paragraph 109 will be placed on the lower region of the disk when it is hung vertically so it may be exposed when the outside information disk 30 is raised by moving it to the inner hole.

111. The outside information disks 30 from paragraph 92 on the spin wheel 15 from paragraph 72 are interchangeable with the key signature disks 5 from paragraph 19.

112. The outside information disks 30 from paragraph 92 may also double as key signatures when inserted in the clear disc holder 7A from paragraph 16 or disk holder hole 8F from paragraph 63 on the scale isolator's sliders 4.

113. The key signatures on the outside information disks 30 may be used in lieu of manually constructing various key signatures with the accidental game pieces from paragraph 132 (see FIG. 6).

114. The key signatures on the outside information disks 30 from paragraph 92 or key signature disks 5 from paragraph 19 are either major or natural minor.

115. Harmonic and melodic minor scales require accidental game pieces from paragraph 132 (see FIG. 6) that are additional to the key signatures depicted on either the information disks or key signature disks 5 from paragraph 114.

116. Mounted above the circle of 5ths spin wheel 15 from paragraph 72 is an arc-shaped sign with the mnemonic device used for remembering the order of accidentals in a key signature: FCGDAEB.

117. The arc-shaped sign in paragraph 116 is the order of accidentals mnemonic sign 24.

118. The order of accidentals mnemonic sign 24 from paragraph 117 has a similar shape to the arc of a portion of the spin wheel 15 from paragraph 72.

119. The surface of the order of accidentals mnemonic sign 24 from paragraph 117 is big enough to contain the FCGDAEB letters in large bold font.

120. The sign from paragraph 117 also contains a single sharp accidental followed by an arrow pointing right preceding the F from paragraph 119, and an arrow pointing left followed by a flat accidental after the B from paragraph 119.

121. Mounted above the order of accidentals mnemonic sign from paragraph 117 at approximately the position of 10 o'clock is a comedy drama mask 20.

122. The mouth of the comedy drama mask from paragraph 121 will contain either a permanent picture of the formula for a major scale in steps 22, or will have a mouth in relief with a removable rectangular block containing the formula for a major scale on one side, and the word "major" on the other side.

123. The rectangular block in paragraph 122 is the major scale step-formula-insert 22.

124. Mounted above the order of accidentals mnemonic sign at approximately the position of 2 o'clock is a tragedy drama mask 21.

125. The mouth of the tragedy drama mask 21 from paragraph 124 will contain either a permanent picture of the formula for a minor scale 23, or will have a mouth in relief with a removable rectangular block insert containing the formula for a minor scale on one side, and the word "minor" on the other.

126. The rectangular block from paragraph 125 is the minor scale step-formula-insert 23.

127. The masks from paragraphs 121 and 124 can be mounted to the spin wheel by threading a dowel or some other device through the masks' temples.

128. The device from 127 is the drama mask holder rod 28.

129. The drama mask holder rod 28 from paragraph 128 can be attached near its midpoint to the vertical post 27 that holds the wheel.

130. The purpose of the comedy drama mask 20 from paragraph 121 in housing the major scale step-formula-insert 22 from paragraph 123 is to pictorially represent the "happy" sound of a major scale.

131. The purpose of the tragedy drama mask 21 from paragraph 124 in housing the minor scale step-formula-insert 23 from paragraph 126 is to pictorially represent the "sad" sound of a minor scale.

Other Game Pieces

132. In addition to the scale isolator 1 from paragraph 1, several accidental game pieces will be required to aid in the construction of various scales and key signatures. (see FIG. 6)

133. The pieces from paragraph 132 are in the shape of sharps, flats, double sharps, double flats or naturals.

134. The pieces from paragraph 132 could be made of black colored plastic, rubber, flat magnetic or similar type materials.

135. The accidental game pieces from paragraph 132 are directly proportional in a musical sense to the notes, staff and key signatures displayed on the notes on staff picture 11B, ascending/descending whole note picture 10D, and key signature disks 5.

Figure 6:
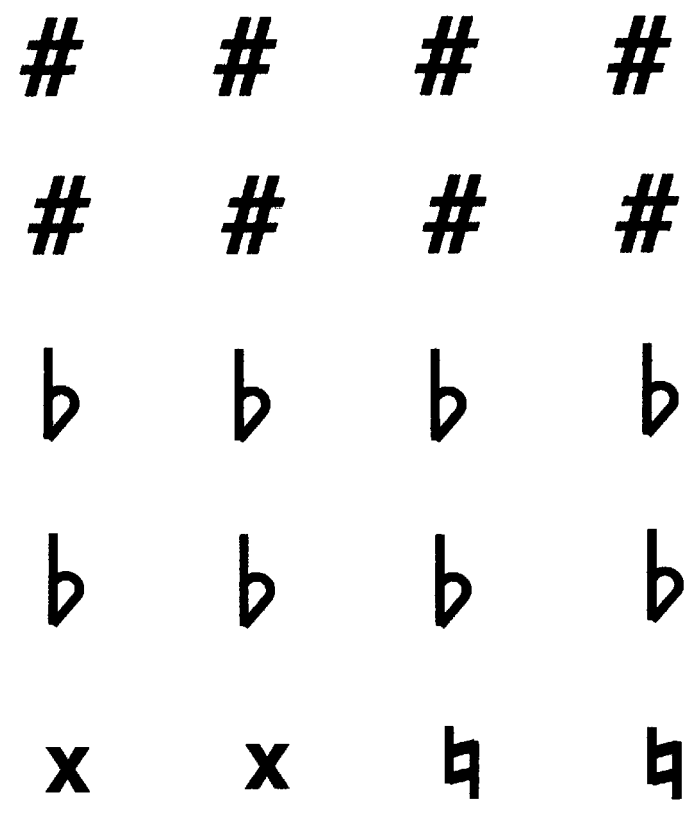

136. There will be a minimum of 8 sharps, 8 flats, 2 double sharps and 2 naturals from paragraph 133 required to construct various ascending or descending versions of the major or minor scales as shown in FIG. 6.

Figure 4:
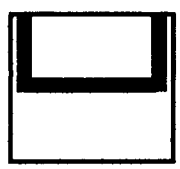
FIG. 4 is a picture of the 9 step tiles.
Figure 4:
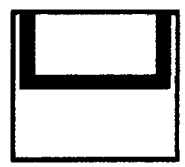
Figure 4:
Figure 4:
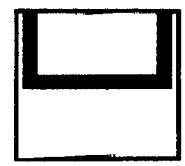
Figure 4:
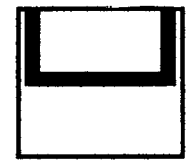
Figure 4:
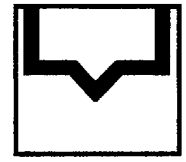
Figure 4:
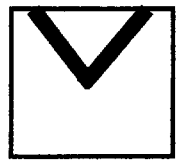
Figure 4:
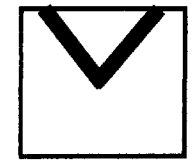
Figure 4:
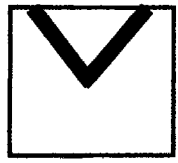

137. There will be a minimum of 9 step tiles 2 containing pictures of 3 types of intervals as illustrated in FIG. 4.

138. The purpose of the step tiles in paragraph 137 is to show the intervalic relationships between the notes.

139. The tiles in paragraph 137 will be square shaped.

140. The width of the tiles in paragraph 137 will be relatively proportional to the distance between 2 whole notes on either the notes on staff picture 11B or ascending/descending whole note picture 10D.

141. At least 3 tiles illustrated in FIG. 4 from paragraph 137 contain the symbol for a half step.

142. At least 5 tiles illustrated in FIG. 4 from paragraph 137 contain the symbol for a whole step.

143. At least one tile illustrated in FIG. 4 from paragraph 137 contains the symbol for a whole and a half step.

144. The 9 or more tiles from paragraphs 141, 142 and 143, collectively, are used to show the intervalic steps between notes as well as the formulas for various scales and modes.

145. Because there are only 7 intervalic steps in major and minor scales, only 7 step tiles 2 from paragraph 137 will be used at a time.

146. Repositioning 7 step tiles from paragraphs 141, 142 and 143 in various configurations can also show the intervalic symbols for all modes.

147. Fastened to the lower center region of both the clear horizontal slider 8A and clear vertical slider holder 14 are two small rectangular blocks called bookend blocks 9.

148. The bookend blocks 9 from paragraph 147 are permanently attached and serve as book ends for 7 of the 9 step tiles 2 from paragraph 137.

149. The bookend blocks 9 from paragraph 147 enable 7 step tiles 2 from paragraph 137 to directly line up under the exposed 8 whole notes and enharmonic keyboard label 10B from paragraph 13, thereby showing the step relationship between notes.

Figure 5A:
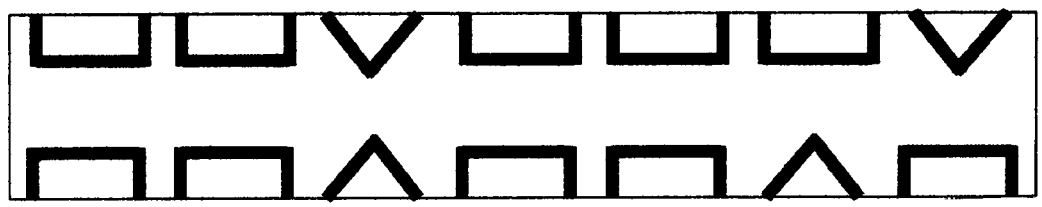
FIG. 5A is a picture of the major and natural minor step formula side of the major and 3 forms of minor formula flat board insert.
Figure 5B:
FIG. 5B is a picture of the harmonic minor and melodic minor step formula side of the major and 3 forms of minor formula flat board insert.

150. There will be a major and 3 forms of minor formula flat board insert 3, as illustrated close up in FIGS. 5A and 5B.

151. The major 3 forms of minor formula flat board insert 3 can be inserted between the bookend blocks from paragraph 147 and under the long U-channel frame 4A.

152. The long U-channel frame 4A from paragraph 151 will hide the upside down scale on the exposed side of the major and 3 forms of minor formula board insert 3, while the short U-channel frame 4B serves as a frame for the shorter vertical sides of the scale isolator 1.

153. The major and 3 forms of minor formula flat board insert 3 from paragraph 150 is a small rectangular board.

154. The width dimension of paragraph 150 is exactly that of 7 step tiles 2 from paragraph 137 horizontally placed end to end.

155. On either face of the major and 3 forms of minor formula flat board insert 3 from paragraph 150 will be pictures, in steps, of the major, natural minor, harmonic minor and melodic minor scales.

156. There will be 2 scale-step formula pictures on each side of the 3 forms of minor formula flat board insert 3 from paragraph 150.

157. The scale-step formula pictures, from paragraph 150, will be positioned so that one scale picture is right-side up and one is upside down.

158. The right side up scale step picture from paragraph 150 will be in the long upper horizontal region.

159. The upside down scale step picture from paragraph 150 will be in the long lower horizontal region.

160. A total of 4 scale-step pictures (major, natural minor, harmonic minor and melodic minor) can be placed on the flat board insert 3 from paragraph 150 when positioned as discussed in paragraphs 156 and 157.

Figure 7:
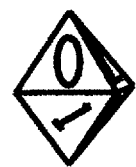
FIG. 7 is a picture of the 8-sided die.

161. There will be an 8-sided dice containing the numbers 0, and 1-7, as illustrated in FIG. 7.

Figure 8A:
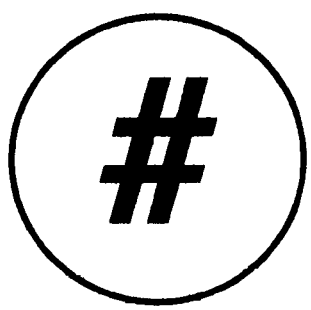
FIG. 8A is a picture of the sharp side of the sharp and flat coin.
Figure 8B:
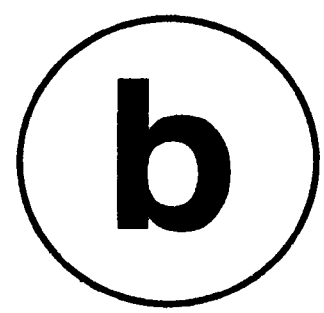
FIG. 8B is a picture of the flat side of the sharp and flat coin.

162. There will be a 2-sided coin containing the sharp symbol on one side and flat symbol on the other, as illustrated in FIGS. 8A and 8B.

Figure 8C:
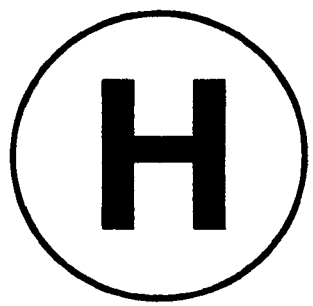
FIG. 8C is a picture of the H side of the harmonic and melodic coin.
Figure 8D:
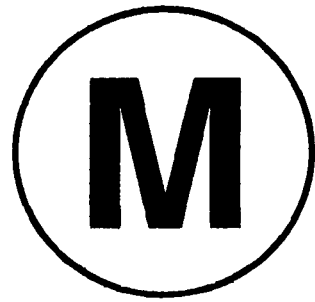
FIG. 8D is a picture of the M side of the harmonic and melodic coin.

163. There is a 2-sided coin containing the letter "H" for harmonic minor and "M" for melodic minor, as illustrated in FIGS. 8C and 8D.

FIGS. 9, 9A, 9B, 9C, 9D, 9E, 9F and 9G

164. There is a deck of 61 cards.

Figure 9:
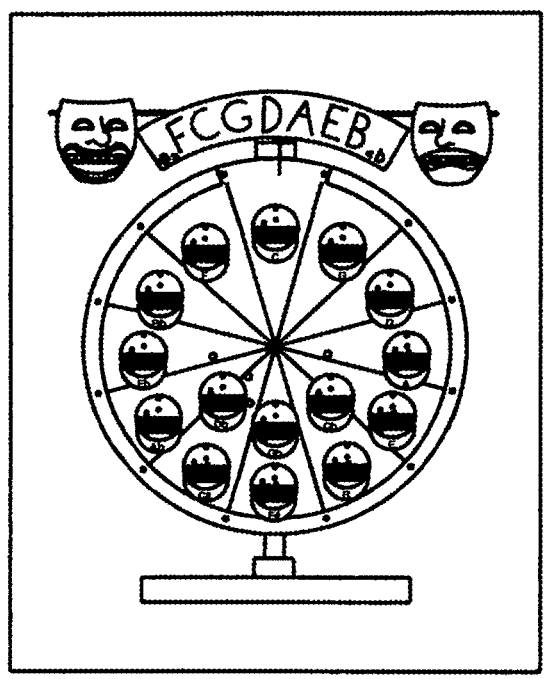
FIG. 9 is a picture of the circle of 5ths spin wheel wild card.
Figure 9A:
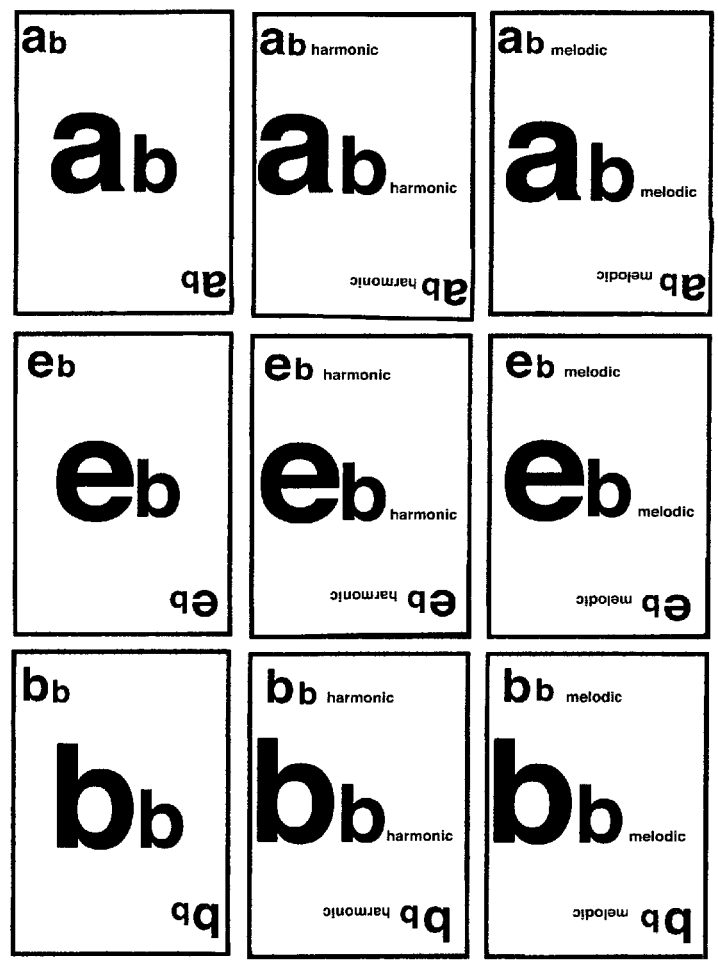
FIG. 9A is a picture of the ab, eb and bb natural, harmonic and melodic minor cards.
Figure 9B:
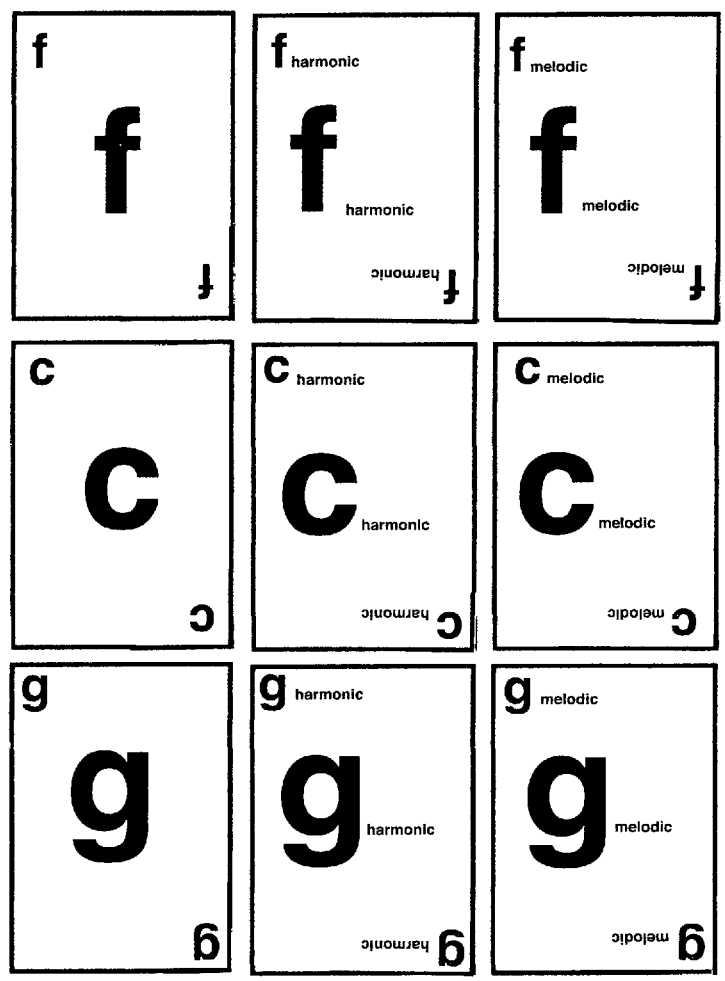
FIG. 9B is a picture of the f, c and g natural, harmonic and melodic minor cards.
Figure 9C:
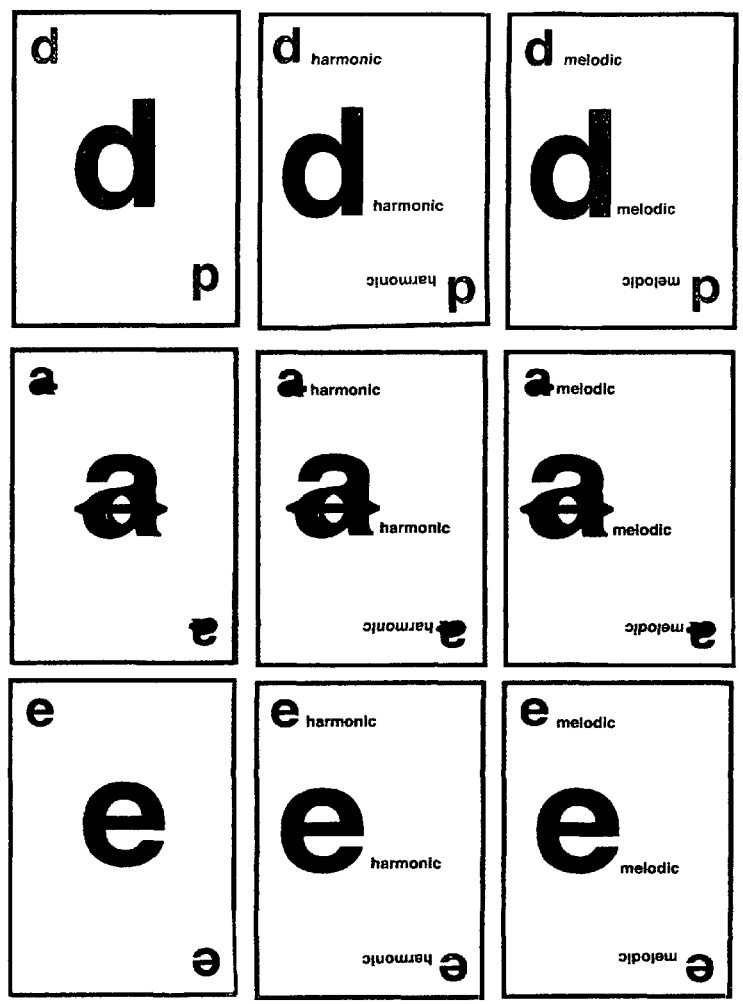
FIG. 9C is a picture of the d, a and e natural, harmonic and melodic minor cards.
Figure 9D:
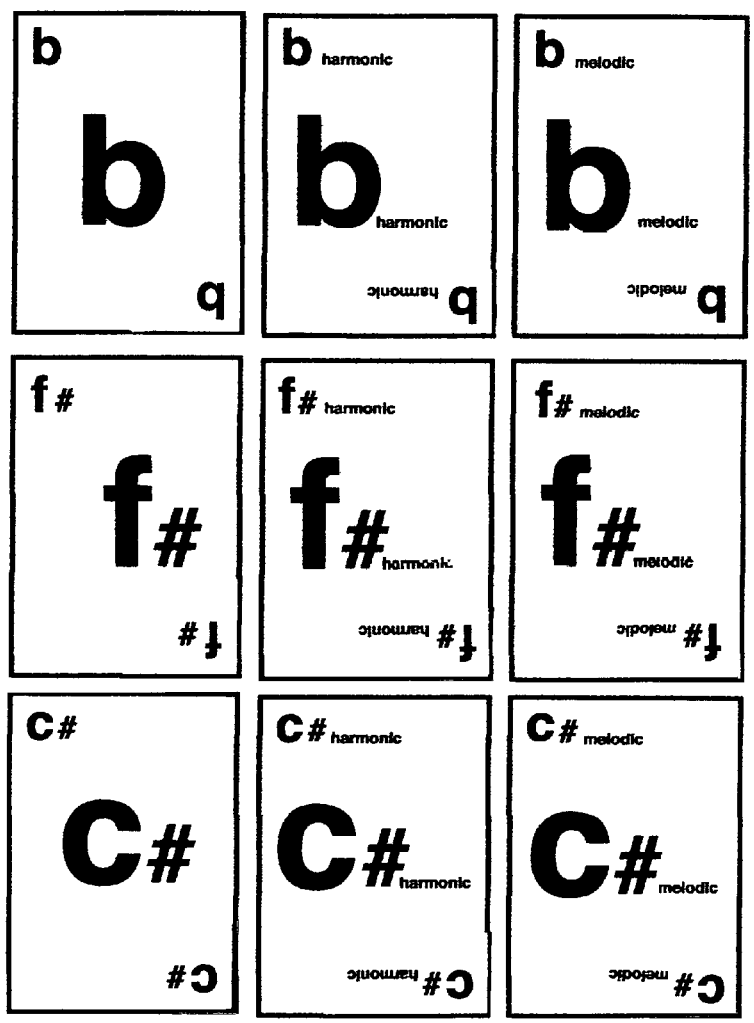
FIG. 9D is a picture of the b, f# and c# natural, harmonic and melodic minor cards.
Figure 9E:
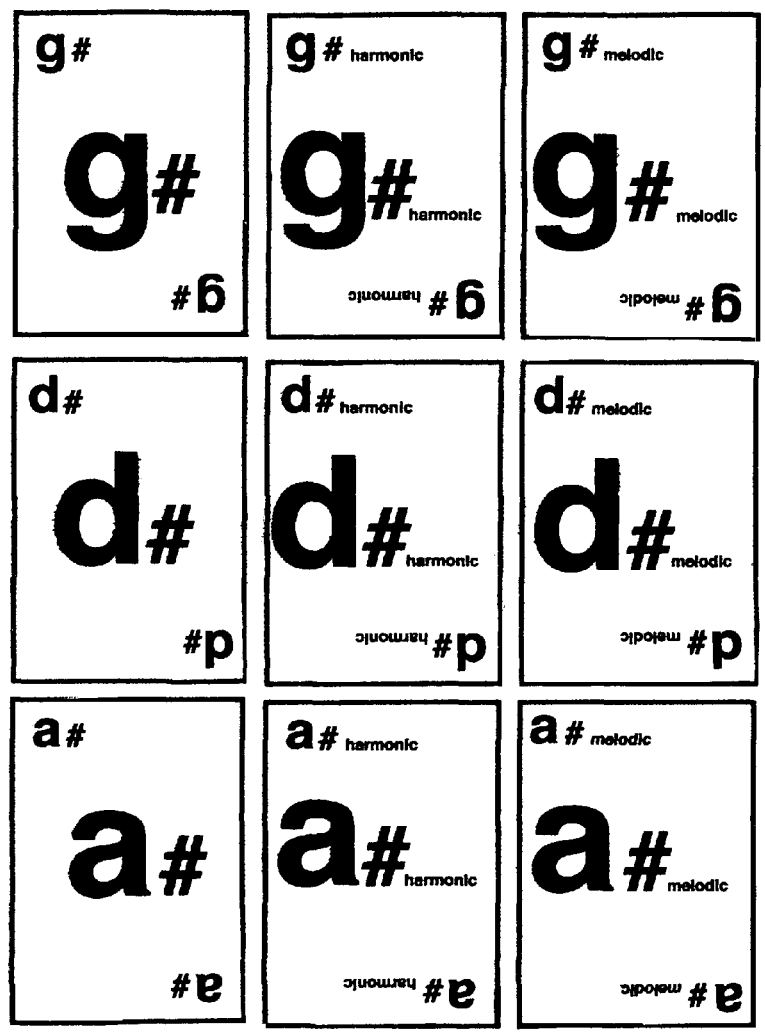
FIG. 9E is a picture of the g#, d# and a# natural, harmonic and melodic minor cards.
Figure 9F:
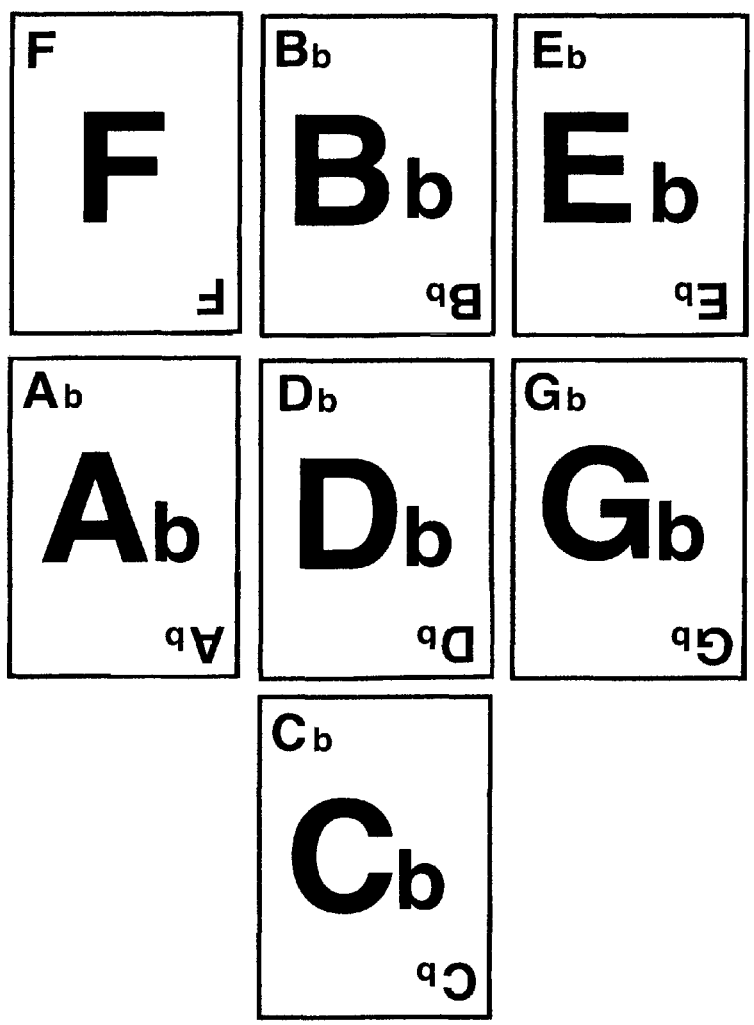
FIG. 9F is a picture of the F, Bb, Eb, Ab, Db, Gb, Cb major cards.
Figure 9G:
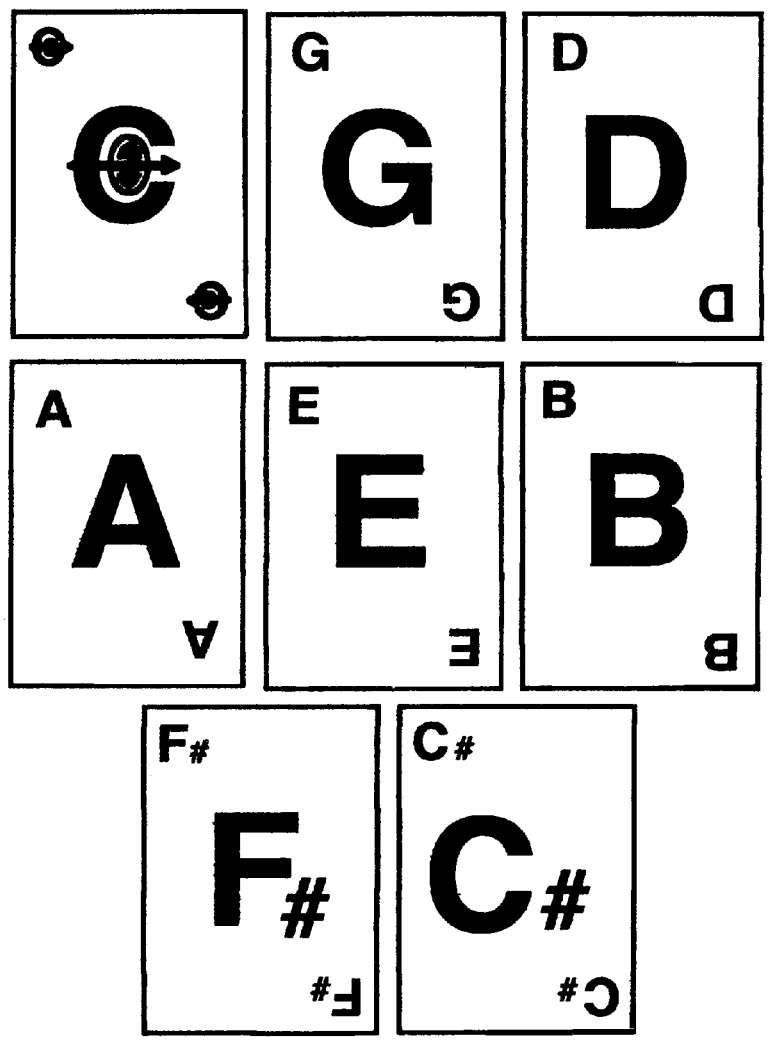
FIG. 9G is a picture of the C, G, D, A, E, B, F sharp, C sharp major cards.

165. The card deck from paragraph 164 contains a wild card as illustrated in FIG. 9.

166. The card deck from paragraph 164 contains one of each of the 60 musical keys, as illustrated in FIGS. 9A, 9B, 9C, 9D, 9E, 9F and 9G.

167. The cards from paragraph 164 will have 2 contrasting shades.

168. The sharp major key cards of G, D, A, E, B, F sharp, C sharp, and natural, harmonic and melodic minor cards of e, b, f sharp, c sharp, d sharp, g sharp, and a sharp, will be a different contrast from the flat major key cards of F, Bb, Eb, Ab, Db, Gb, Cb, and natural, harmonic and melodic minor cards d, g, c, f, bb, eb, ab.

169. The cards from paragraph 164 containing no key-signature accidentals, C major, a minor, a harmonic minor and a melodic minor will contain 2 contrasting shades, a "zero," and a two-sided arrow pointing left and right.

170. The wild card from paragraph 165 will contain a picture of the spin wheel from paragraph 72.

ADVANTAGES

From the description above a number of advantages of some embodiments of my Music Theory Casino Fundamentals Game become evident. The immediate isolation of an enharmonically spelled keyboard picture cross referenced with both 8 diatonic notes and 7 intervalic steps reduces scale explanation to its simplest terms.

The two octave range of the scale isolator device addresses an example of every type of major scale, natural minor scale, harmonic minor scale, melodic minor scale or mode for instant analysis.

The key signature disk and information disks on the spin wheel enable immediate construction and explanation of key signatures and the circle of 5ths.

The staff peg adjusters on the scale isolator allow for notated scales to vertically align with keynotes that begin on sharp or flat accidentals.

The ascending/descending scale picture on the bottom of the scale isolator helps to facilitate greater understanding of major and 3 forms of minor and is especially useful in explaining the melodic minor scale.

The easy to use manipulatives: scale isolator board, accidentals, step tiles, key signature disk, spin wheel, die, coins and card deck, which are all highly tactile, provide a "game like" feel while allowing for quick analysis and construction of scales, modes and key signatures.

While the descriptions contained in this document have many specific references to diatonic scales, modes, key signatures and the circle of 5ths, these should not be construed as factors that limit the scope of possibilities of the device in regards to music theory discussion. These manipulatives are simple illustrations of some of several embodiments. For example, other types of sliders containing musical information related to the further discussion of music theory could be developed to address pentatonic, blues, chromatic, and whole tone scales. Sliders could be developed to specifically address chords and intervals greater than the whole step and half step interval discussed in this embodiment. Other clefs could be used besides the treble clef of this embodiment. Also, the static scale notes on the staff slider could be positioned on other areas of the staff to achieve scales written in higher or lower octaves. Therefore, the scope of the embodiments should be decided by subsequent claims and their equivalents, rather than by the examples presented.

I claim:

1. A musical theory board game, comprising:
    a scale isolator board having a musical staff and a representation of a keyboard sufficient to include a two-octave range;
    a slideable window configured to display and isolate eight diatonic notes and seven intervallic steps of a musical scale on the musical staff and a corresponding frame of the keyboard; and
    at least one major and minor formula step-size board insert configured to be inserted within the slideable window underneath the musical staff.

2. The musical theory board game of claim 1, further comprising:
a staff slider configured to horizontally shift by a half-step to the left or right the eight diatonic notes and seven intervallic steps viewable through the slideable window.

3. The musical theory board game of claim 2, further comprising:
one or more staff peg adjusters configured to horizontally adjust the staff slider so that the at least one major and minor formula step-size board insert aligns with notes that begin on sharp or flat accidentals.

4. The musical theory board game of claim 3, wherein the one or more staff peg adjustors are removable and re-positionable.

5. The musical theory board game of claim 3, wherein the one or more staff peg adjustors are magnetic.

6. The musical theory board game of claim 1, further comprising:
a disk holder overlaid on the scale isolator board and configured to hold a key signature disk corresponding to the musical scale.

7. The musical theory board game of claim 6, wherein the disk holder and the key signature disk both include a bump at the 9 o'clock position for alignment of the key signature disk in the disk holder.

8. The musical theory board game of claim 6, wherein the key signature disk include indentations that are opposite each other on edges of the key signature disk, the indentations configured to immobilize the key signature disk when inserted in the disk holder.

9. The musical theory board game of claim 1, further comprising:
a spin wheel to indicate a plurality of key signatures displayable by the slideable window.

10. The musical theory board game of claim 9, wherein the spin wheel is a circle of 5ths.

11. The musical theory board game of claim 1, further comprising:
a plurality of step tiles configured to be placed within or near the slideable window and to indicate step size between notes of the musical scale.

12. The musical theory board game of claim 11, further comprising:
a pair of bookend blocks for holding at least some of the plurality of step tiles within the slideable window.

13. The musical theory board game of claim 1, further comprising:
one or more spacers configured to adjust the slideable window.

14. The musical theory board game of claim 1, wherein the scale isolator board is configured to illustrate examples of every type of major scale, natural minor scale, harmonic minor scale, and melodic minor scale or mode.

15. The musical theory board game of claim 1, wherein the scale isolator board includes notes representing an ascending scale and notes representing a descending scale.

16. The musical theory board game of claim 1, wherein the at least one major and minor formula step-size board insert is double-sided and includes two scale-step formula pictures on each side.

17. The musical theory board game of claim 1, wherein the scale isolator board is double-sided, and a reverse side of the scale isolator board configured to display a representation of a melodic minor scale.

* * * * *